Oct. 8, 1935.  E. T. DAHL  2,016,317
CONTROL MECHANISM
Filed Sept. 30, 1932
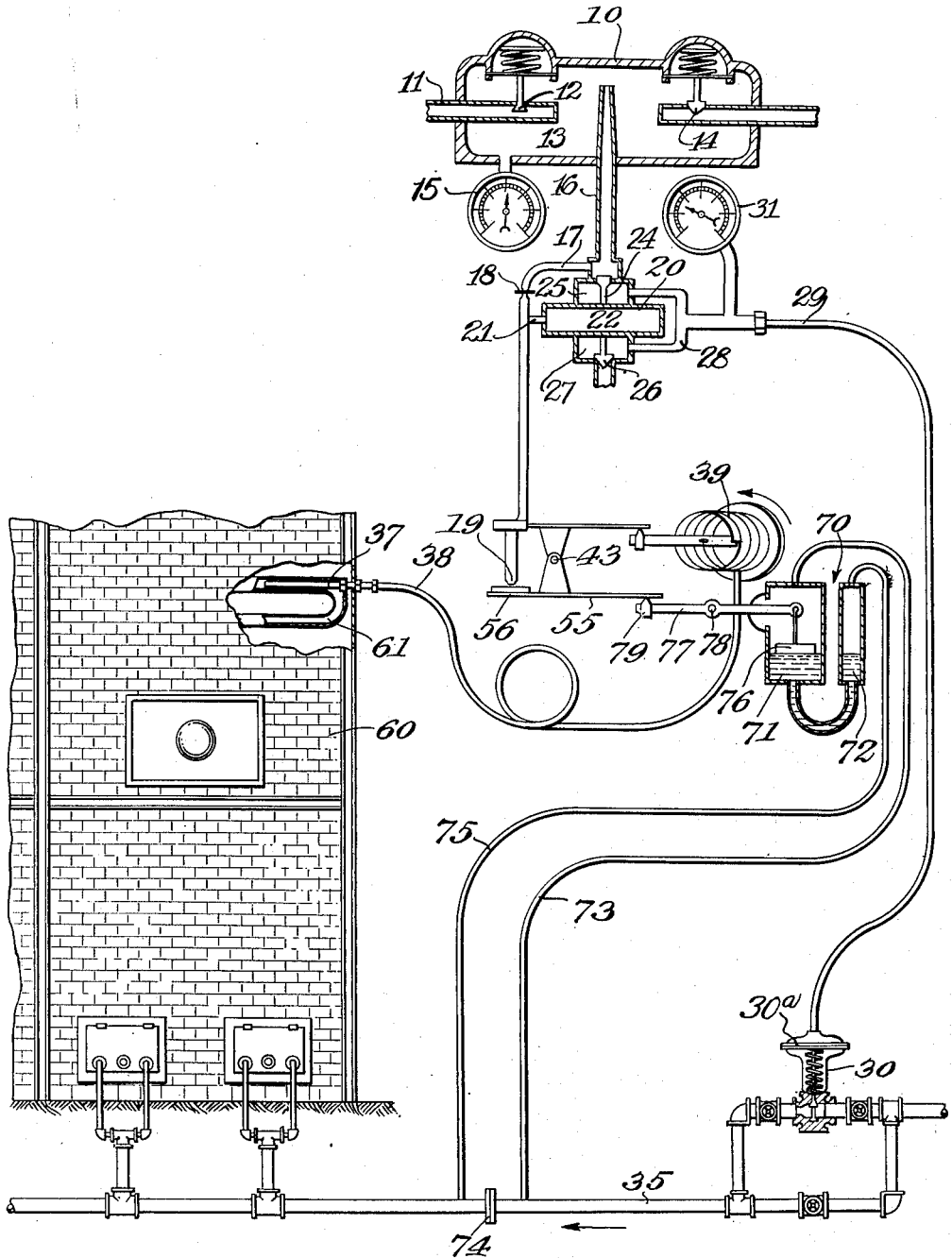
Inventor:
Edward T. Dahl
By Macleod Calhu Copeland & The
Attorneys Patented Oct. 8, 1935

2,016,317

UNITED STATES PATENT OFFICE 2,016,317

CONTROL MECHANISM

Edward T. Dahl, Randolph, Mass., assignor, by mesne assignments, to Eldon Macleod, Westwood, Mass., Frank A. Morrison, Newton, Mass., Cameron Macleod, Berwyn, Pa., Leslie Soule, Dedham, Mass., and Sullivan A. Sargent, Jr., Needham, Mass., trustees, doing business as Mason-Neilan Regulator Company, Boston, Mass.

Application September 30, 1932, Serial No. 635,565

2 Claims. (Cl. 236—32)

This invention relates to control mechanism and more particularly to mechanism for controlling the temperature of a medium being processed in accordance with changes in pressure or rate of flow of the processing medium.

This invention is a modification and adaptation of the basic principle of control disclosed in my application Serial No. 635,356, filed September 29, 1932, for Dual control mechanism, to which reference is hereby made. The invention herein may be classified as temperature control in a fuel heated installation. In my aforementioned application the processing medium is steam which affects the processed medium through a heat exchange relationship. Herein the processing medium is a liquid or gaseous fuel which affects or processes the processed medium by its own combustion. This installation is specifically adapted to maintain a constant temperature, for instance, in hydrocarbons being processed in a still, boiler or fractionator, but it is understood, of course, that any other substance may be similarly processed. Illuminating gas is preferably used as the fuel for heating the medium being processed, but other liquid or gaseous fuels may be substituted as desired. A control valve on the fuel supply line controls the amount of fuel supplied for heating. A thermostat is placed in the processed medium, and since much of the fluctuation in the temperature of the processed medium has been discovered to be due to previous fluctuations in the pressure or rate of flow of the fuel or other processing medium (assuming of course a fuel of constant B. t. u. value) a pressure or rate of flow responsive device is placed in the fuel supply line below the control valve. The thermostat and pressure or rate of flow responsive instrument then operate through their resultant action to control the supply of fuel, by operating on the control valve through an independent pressure system. In this way a much more accurate temperature control is obtained over the medium being processed than in previous installations which control by the action of the thermostat alone in the processed medium.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The single figure of drawing is a diagrammatic view of my dual control mechanism as adapted for temperature control in a fuel heated installation, and having a rate of flow responsive device and coil in the fuel supply line.

10 represents the mechanism for maintaining an adequate and constant pressure of air for operating the independent pressure system which 10 in turn operates the control valve of the fuel supply line. The air is supplied through pipe 11 and passes into the reservoir 13 through reducing valve 12, which is preferably set for 15 pounds' pressure. A safety relief valve 14 is likewise provided in the mechanism 10, again preferably set for 15 pounds' pressure and if pressure in the reservoir 13 exceeds 15 pounds as indicated by gauge 15 the relief valve 14 opens and permits air to escape until the pressure is reduced. The air from reservoir 13 passes down the pipe 16 leading to a diaphragm mechanism 20 and a flexible branch pipe 17 having a fixed orifice 18 bypasses the stream of air. The independent pressure system ordinarily exhausts to the atmosphere through the exhaust orifice 19, but as controlled by the flapper 56 actuated by the rate of flow of fuel in the fuel supply line, the independent pressure is diverted through the diaphragm mechanism 20 to the control valve 30 on the fuel supply line 35.

Branch pipe 17 connects with the pilot mechanism 20 through pipe 21 below the fixed orifice 18 which leads into a central diaphragm chamber 22. A stem 24 abutting the top side of the diaphragm chamber 22 forms a valve between pipe 16 and chamber 25. A similar stem 26 abutting the bottom side of the diaphragm chamber 22 forms an exhaust valve between the chamber 27 and the atmosphere. Both chambers are connected on the outside by pipe 28 which leads through pipe 29 to the control valve 30. A gauge 31 is connected to pipe 29 and records the pressure in said pipe. Control valve 30, which is preferably a diaphragm motor valve, controls the supply of fuel to the furnace 60.

On the closing of exhaust orifice 19, pressure in diaphragm chamber 22 builds up, forcing valve 26 closed and valve 24 open, allowing pressure from pipe 16 to enter directly into chamber 25, flow through connecting pipe 28 into chamber 27 and equalize the pressures therein. When pressure in chamber 25 balances the force in central chamber 22, valve 24 closes to prevent pressure in 25 from increasing. Air then flows through pipes 28 and 29 to control valve 30, the pressure of which on the diaphragm 30a opens the valve 30 and permits greater flow of fuel to furnace 60. On the opening of exhaust orifice 19, the action is opposite.

A still, reboiler or other furnace 60 is provided in which is arranged pipe 61 or any other suitable container for the medium or substance being heated or processed. A thermostat 37 or other temperature responsive instrument preferably containing an expansible fluid is placed in the pipes 61 or other container for the medium being processed, and connects through pipe 38 to a helical coil 39, Bourdon tube or other pressure responsive device (i. e. pressure responsive when thermostat 37 contains an expansible fluid). Fuel is supplied to the furnace 60 through fuel supply line 35 in any suitable manner. An instrument 70 responsive to rate of flow is connected in the fuel supply line between the control valve 30 and the furnace 60. The instrument 70 preferably comprises a mercury manometer, of well known construction, having two pots 71 and 72 containing mercury and connected at their bottoms, the pot 71 in turn being connected by pipe 73 to the upstream side of an orifice plate 74 placed in the fuel supply line 35. The pot 72 is likewise connected by a pipe 75 on the downstream side of the orifice plate 74 in the fuel supply line. A float 76 is arranged in the pot 71 and is attached to one end of an arm 77 fulcrumed at 78 and having sliding wedge 79 on the other end, and placed in abutting relation to the lever 55, which is itself fulcrumed at 43.

The device operates in the same manner as that disclosed in my application Ser. No. 635,356 previously referred to. An increase in temperature in the hydrocarbons or other medium being processed is transmitted to the thermostat 37 and this in turn causes helical coil 39 to unwind and orifice 19 to open partially, allowing the independent pressure to exhaust and control valve 30 to close partially thereby decreasing the amount of fuel supplied to the furnace 60. On a decrease in temperature the action is opposite. Likewise the rate of flow responsive device 70 reacts to changes in pressure on both sides of the fixed orifice 74 in the fuel supply line 35, and these changes in pressure, as induced by changes in rate of flow of the fuel through line 35, are in turn transmitted to the mercury pots 71 and 72, in the well known manner. These changes in rate of flow are then transmitted through float 76, arm 77, lever 55 and flapper 56, exactly as the pressure coil 52 in my aforementioned application Serial No. 635,356. An increase in rate of flow of the fuel supply operates to open exhaust orifice 19 allowing the independent pressure to exhaust and so to partially close control valve 30, thereby decreasing the amount of fuel supplied to the furnace 60. On a decrease in rate of flow, the action is opposite. The temperature responsive instrument 37 and the rate of flow responsive instrument 70 operate independently as their respective conditions change, but the control valve 30 on the fuel supply line 35 is actuated by the resultant of the movements induced by the two instruments.

It is to be understood that the manometer or rate of flow instrument 70 is interchangeable with a pressure responsive device such as the helical coil 52 in my application Serial No. 635,356. But as changes in pressure of the fuel supply are ordinarily not effective enough to operate a helical coil, the mercury manometer or other instrument sensitive to a change in rate of flow is preferably used. It is also understood that the mercury manometer may be replaced by any other mechanism sensitive to changes in rate of flow, such as a pair of sylphon bellows or a diaphragm with a connection to both sides of the orifice plate 74. Likewise the manometer or rate of flow responsive instrument 70 may be filled with water or a light oil, instead of mercury in any situation where fine amounts of fuel are used.

By means of my invention changes in temperature of the processed medium are anticipated and fluctuations in the rate of flow of the fuel supply are compensated for through the independent pressure system operating on the control valve 30, before these fluctuations have affected the temperature of the hydrocarbons or other medium being processed. Also, on the departure of the processed medium from its predetermined temperature, it is brought back to its predetermined temperature merely through a change in the rate of flow of the fuel, and not by completely shutting off the fuel supply. Thus the flow of fuel is even and constant, and this eliminates the over-control, or alternate movement of the control from "wide-open" to "shut" positions, and consequent "hunting" action. The temperature of the processed medium is governed therefore by the joint and resultant action of the two instruments, one responsive to changes in temperature of the processed medium and the other responsive to changes in pressure or rate of flow of the fuel or processing medium. In this way a much more accurate temperature control of the medium being processed is secured than where a thermostat alone is used, and this is highly important in the processing of any medium where accurate temperature control is desirable or essential.

I claim:

1. An apparatus for controlling the temperature of a medium processed by being subjected to heat supplied by a fuel, comprising means for supplying fuel to the processed medium, a control valve governing the supply of said fuel, a pilot mechanism utilizing an independent source of pressure for operating said control valve and ordinarily exhausting to the atmosphere, an exhaust valve governing the exhaust from said pilot mechanism, comprising a movable orifice and flapper, levers for moving said orifice and flapper toward and away from each other about a common axis and so operating said exhaust valve, a thermostat responsive to the temperature of the processed medium, a manometer responsive to the rate of flow of the fuel supply, a coil actuated by the thermostat for moving the orifice lever, a float actuated by the manometer for moving the flapper lever and so actuating the exhaust valve of the independent pressure system through the resultant action of said thermostat and manometer.

2. An apparatus for controlling the temperature of a medium processed by being subjected to heat supplied by a fuel, comprising means for supplying fuel to the processed medium, a control valve governing the supply of said fuel, a pilot mechanism utilizing an independent source of pressure for operating said control valve and ordinarily exhausting to the atmosphere, an exhaust valve governing the exhaust of said pressure to the atmosphere, including an orifice and flapper, a supply and waste valve in said pilot mechanism for supplying and wasting pressure to and from said control valve, a diaphragm chamber in said pilot mechanism acted on by said pressure for actuating said supply and waste valve, levers for moving said orifice and flapper toward and away from each other about a common axis and so operating said exhaust valve, a thermostat responsive to the temperature of the processed medium, a manometer responsive to the rate of flow of the fuel supply, a coil actuated by the thermostat for moving the orifice lever, a float actuated by the manometer for moving the flapper lever and so actuating the exhaust valve of the independent pressure system through the resultant action of said thermostat and manometer.

EDWARD T. DAHL.